Oct. 4, 1932.    J. W. TIBBITTS    1,880,584
CULTIVATOR SHIELD
Filed June 21, 1930

Inventor
John W. Tibbitts
By G. C. Brandenburg
his Attorney

Patented Oct. 4, 1932

1,880,584

UNITED STATES PATENT OFFICE

JOHN W. TIBBITTS, OF NORTH BEND, WISCONSIN

CULTIVATOR SHIELD

Application filed June 21, 1930. Serial No. 462,837.

This invention relates to an improvement in cultivator shields.

The object of the invention is to shield the plants to prevent them from being covered by dirt during the cultivation thereof and to assist in having a complete cultivation of the row as well as digging out any weeds that may be in relatively close proximity to the plants.

The invention may thus be termed a duo-purpose shield, and is intended to be applied to cultivators for such crops as corn, potatoes, soy beans, or other row cultivated crops, and to be used when these plants are relatively small or the size when they are usually cultivated.

In the accompanying drawing:

Fig. 2 is a side elevation thereof; and

Fig. 3 is a sectional view through the shield.

Figure 1:
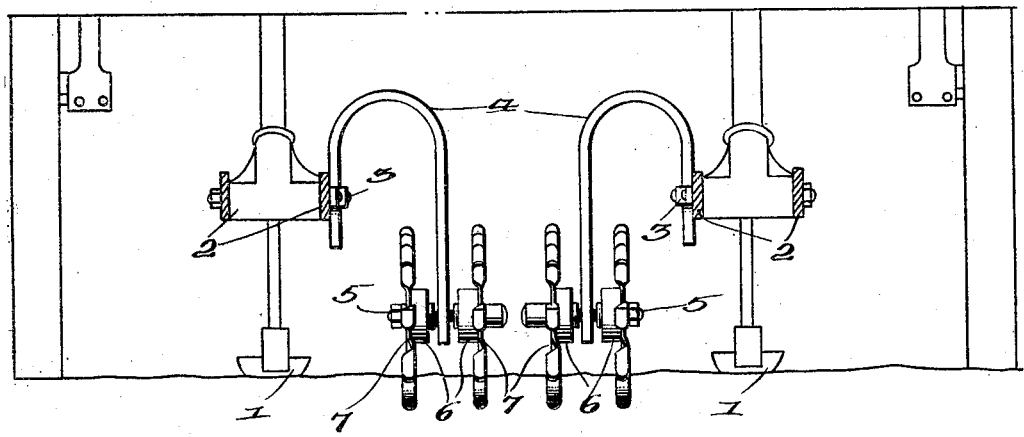
Fig. 1 is a rear elevation of a portion of a cultivator with the invention applied thereto.
Figure 1:
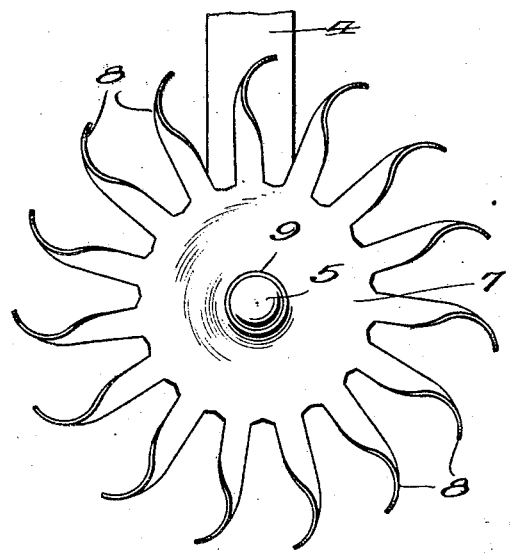
Figure 1:
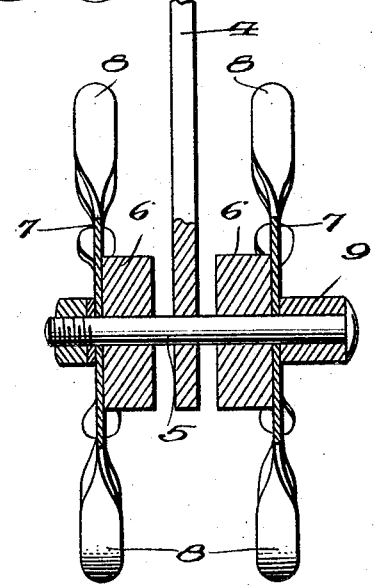

A cultivator of the character to which the invention may be applied is shown in Fig. 1 and has two complete gangs of shovels arranged to straddle the row of the crop in order to completely work the soil on each side thereof. The invention may, however, be attached to a two-row cultivator, if it should be found desirable.

In the form shown in Fig. 1, the shovels are designated generally by the numeral 1 and are carried in gangs suspended from cultivator bars 2. Secured by a clamp 3 to each of the bars 2 of the cultivator is an inverted J-shaped bar 4, which extends into the space between the gangs of shovels. The two bars 4 are arranged in spaced relation, as shown in Fig. 1, to be disposed on opposite sides of the row.

A bolt 5 extends through the lower end of each of the J-shaped bars 4, and mounted on this bolt 5 are hubs 6 arranged upon opposite sides of the bar 4. Secured to the outer ends of the hubs 6 are disks 7 having fingers 8 formed about the peripheries thereof, as shown in Fig. 2. A sleeve 9 is arranged on the inner side of the innermost one of the disks 7 and the bolt 5 extends through this sleeve and the hubs 6 as well as through the lowermost end of the bar 4, to hold all of these in place and to properly suspend the disks from the bar and permit the same to turn relative thereto.

There are preferably two gangs of disks arranged to operate on opposite sides of the row and in relatively close proximity thereto, these gangs being kept spaced apart by means of the sleeves 9 and the heads of the bolts which extend toward each other, as shown in Fig. 1.

This arrangement serves to completely cultivate the soil and dig out the weeds in close proximity to the plants and yet to shield the plants to prevent them from being covered by the cultivator shovels.

This is not ordinarily accomplished by the cultivators which have been used, because there is usually a space of several inches left untouched on each side of the row, which space is thoroughly cultivated by my attachment which also acts to protect the plants and prevent them from being covered.

I claim:

1. The combination with a cultivator having a plow, and a frame for supporting said plow, of a bar extending inwardly and downwardly from said frame, a journal carried by the lower end of said bar and extending in opposite directions therefrom, hubs arranged on said journal on opposite sides of the bar, and disks carried by the outer ends of the hubs in spaced relation and having soil working fingers formed at the peripheries of said disks for working the soil between the cultivator plow and a row and to protect the row from the action of the plow.

2. The combination with a cultivator having a frame, and cultivator shovels suspended therefrom, of a bar extending inwardly and downwardly from the frame, a journal bolt carried at the lower end of the bar and extending therethrough, hubs mounted on said journal bolt on opposite sides of the bar, disks carried by the outer ends of the hubs and in spaced relation from each other, and soil working fingers carried at the peripheries of the disks for working the soil between the cultivator shovels and a row and to protect the row from being covered by the action of the shovels.

3. The combination with a cultivator including a frame, at least two gangs of shovels suspended from the frame in position to straddle a row, supporting bars extending inwardly and downwardly from the frame, a gang of soil working and shielding disks carried by the lower end of such supporting bar, each of said disks having fingers at the peripheries thereof, means for holding the disks in spaced relation from each other, and means extending inwardly from the gangs to hold said gangs in spaced relation.

4. The combination with a cultivator having a plow supporting frame, of an approximately U-shaped supporting bar having short and long arms, means for securing the short arm to the frame, the long arm extending downwardly on the inner side of the frame, a journal carried by the lower end portion of said long arm, and soil working and shielding disks mounted in the journal on opposite sides of the long arm.

5. The combination with a cultivator having plow supporting frames, and plows suspended therefrom, of supporting bars secured to the frames and suspended therefrom, journals carried by the lower ends of the bars, one or more soil working and shielding disks mounted on each of the journals, at least one of the disks on each journal being on the inner side of the bar, and means projecting a substantial distance inwardly from each of the journals to hold the disks carried by one journal separated from the disks carried by the other journal.

6. The combination with a cultivator having plow supporting frames, and plows suspended therefrom, of supporting bars secured to the frames and suspended therefrom, bolts extending through the lower ends of the supporting bars, soil working and shielding disks mounted on the bolts on the inner sides of the supporting bars, and sleeves carried by the bolts and projecting inwardly toward each other from the inner faces of the disks to keep the disks spaced from each other.

7. The combination with a cultivator having plow supporting frames, and plows suspended therefrom, of supporting bars secured to the frames and suspended therefrom, bolts extending through the lower ends of the supporting bars, soil working and shielding disks mounted in pairs on the bolts on opposite sides of the bars, and sleeves surrounding the inner ends of the bolts between the heads thereof and the innermost disks to keep the pairs of disks spaced from each other.

In testimony whereof I affix my signature.

JOHN W. TIBBITTS.